No. 625,211. Patented May 16, 1899.
G. STOFF.
SUGAR CUTTING MACHINE.
(Application filed July 16, 1898.)

(No Model.) 3 Sheets—Sheet 3.

Witnesses
Julius Gutz
John Lotka

Inventor:
G. Stoff
By Munn & Co
Attorneys.

THE NORRIS PETERS CO., PHOTO-LITHO., WASHINGTON, D. C.

UNITED STATES PATENT OFFICE.

GUSTAV STOFF, OF BERLIN, GERMANY.

SUGAR-CUTTING MACHINE.

SPECIFICATION forming part of Letters Patent No. 625,211, dated May 16, 1899.

Application filed July 16, 1898. Serial No. 686,172. (No model.)

*To all whom it may concern:*

Be it known that I, GUSTAV STOFF, a subject of the German Emperor, residing at Berlin, in the Empire of Germany, have invented certain new and useful Improvements in Sugar-Cutting Machines, of which the following is a specification.

My invention refers to machines for automatically chopping rods of candied sugar and the like—i. e., cutting them into pieces of certain lengths—the rods being fed by spring-pressed rollers to a pair of rotating cutters, each having cutters arranged tangentially for cutting said rods into pieces; and the objects of my invention are, first, to provide an arrangement by which the pressure of the feed-rollers may be regulated at pleasure, while the top feed-roller may be raised or lowered, according to the varying diameter of the sugar rod; second, to provide universal joints between the top feed-roller and the shaft driving the same; third, to provide a chute by which the stump or last piece of the sugar rod may be separated from the cut pieces. I attain these objects by the mechanism illustrated by the drawings accompanying this specification.

Figure 1:
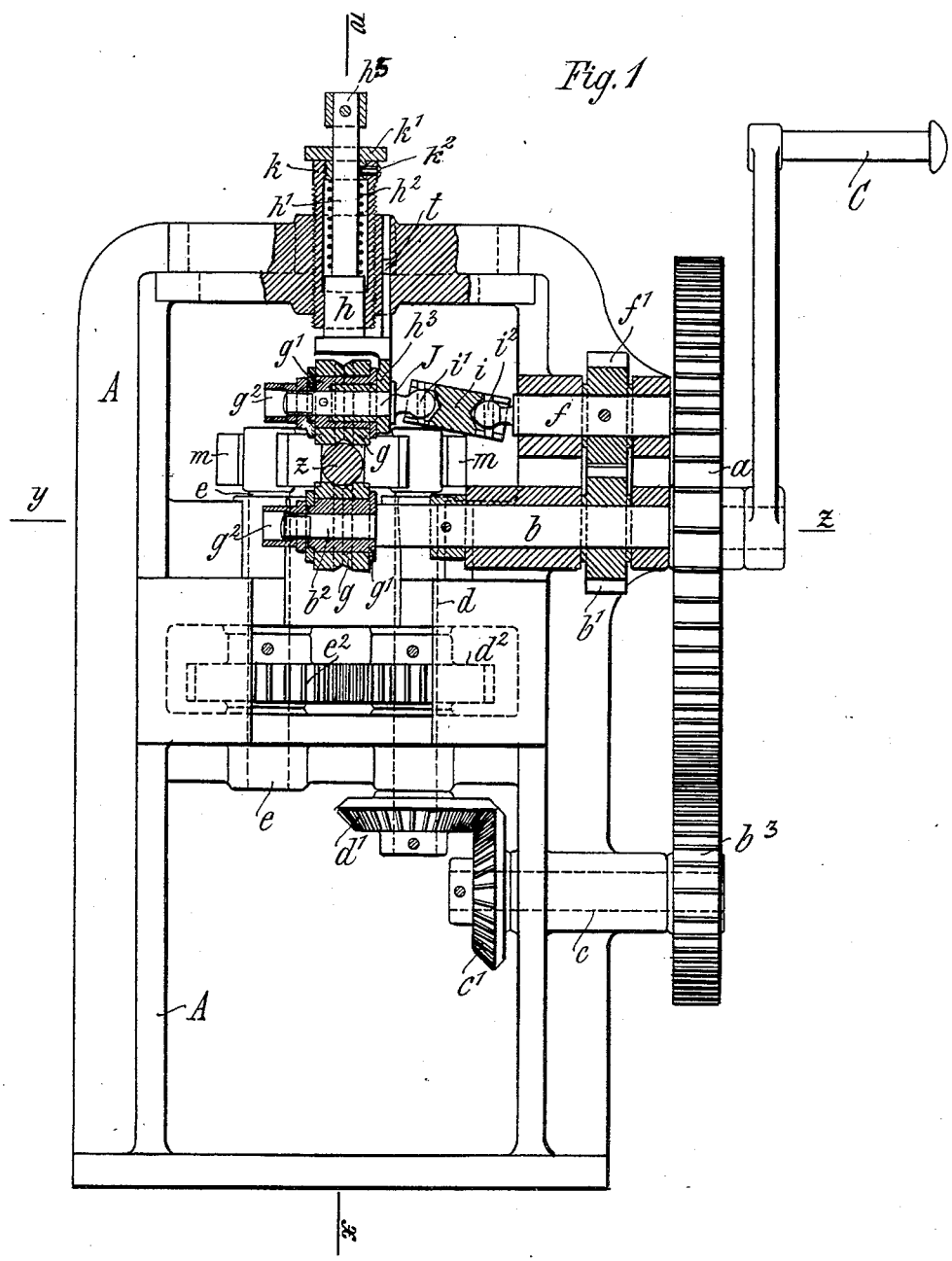
Figure 2:
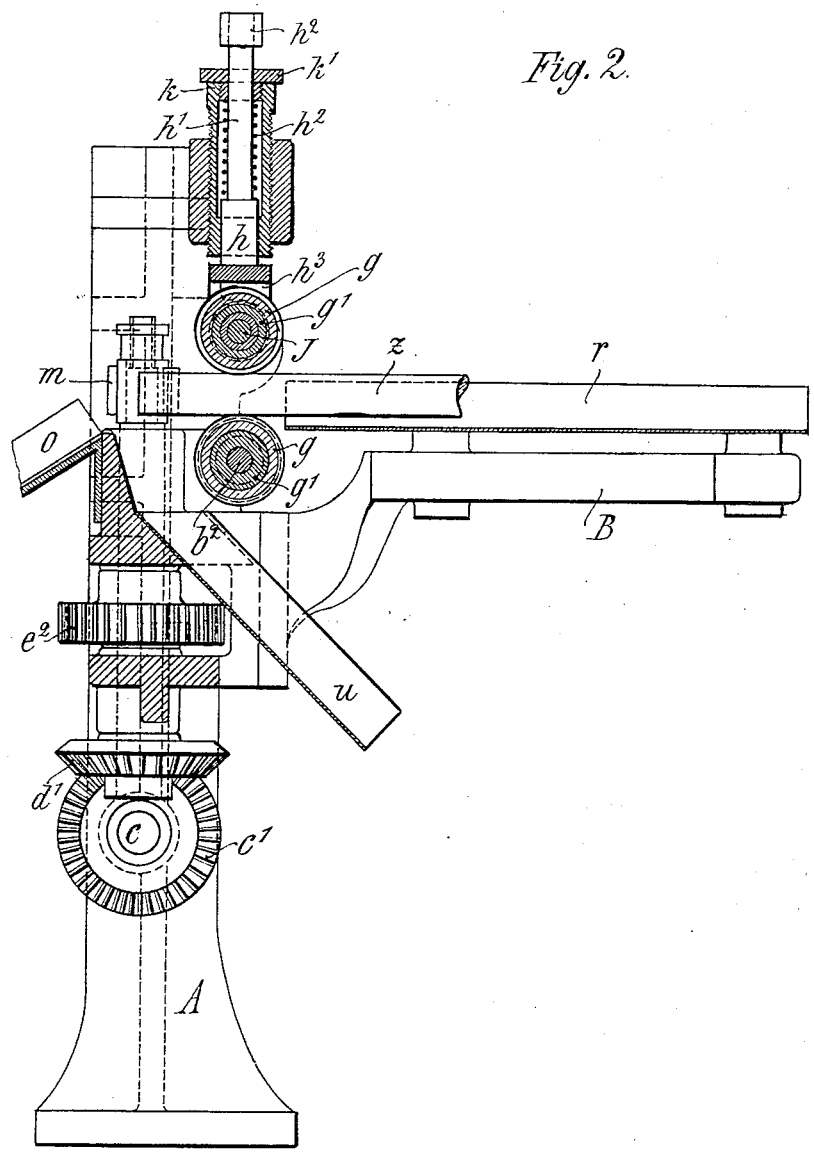
Figure 4:
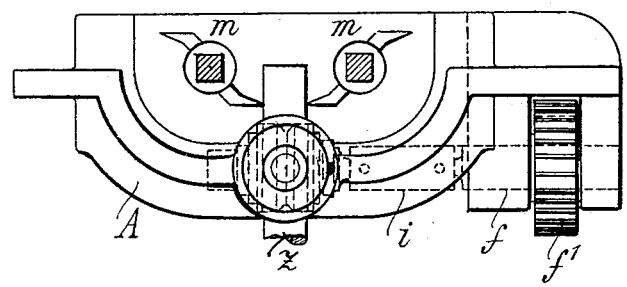
Figure 3:
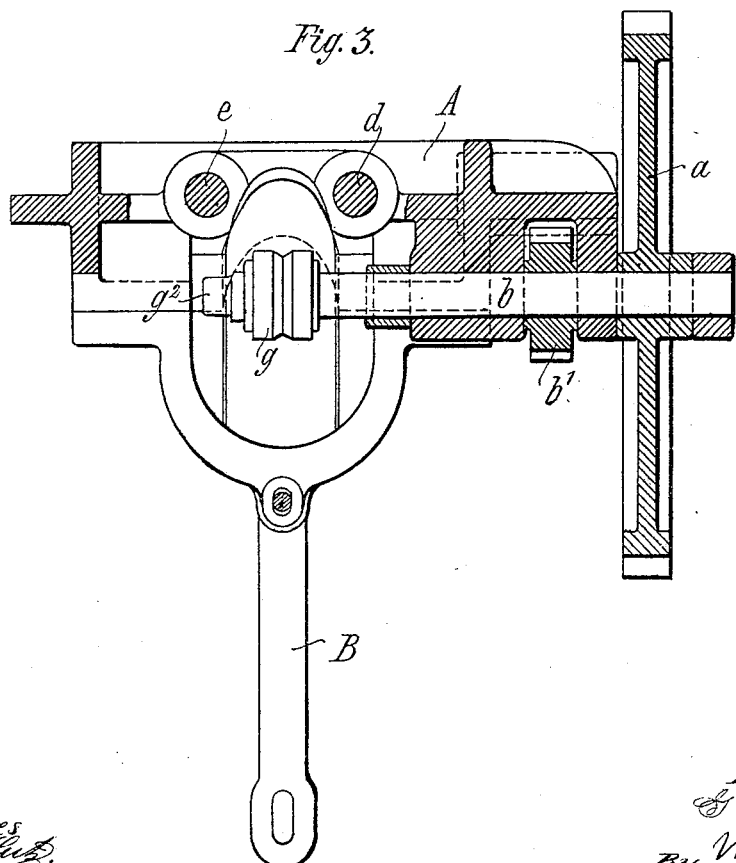

In the drawings, Figure 1 is a front elevation of the machine, certain parts of which are shown in section. Fig. 2 is a vertical sectional view of the machine, taken on the line $w\ x$ in Fig. 1. Fig. 3 is a horizontal sectional view of the machine, taken on the line $y\ z$ in Fig. 1; and Fig. 4 shows in horizontal section the center part of the machine.

Similar letters refer to similar parts throughout the drawings.

A rod of candied sugar $z$ or the like is shown in the drawings as passing between the two mating and registering feed-rollers $g\ g$ (of suitable section) for the purpose of being chopped into pieces of suitable lengths by the rotating cutters $m\ m$. By turning the crank C the shaft $b$ is rotated and with it, by means of the pinions $b'\ f'$, also the shaft $f$. At the end $b^2$ of the shaft $b$ the bottom feed-roller $g$ (of india-rubber) is fastened. For the purpose of replacing it by another one easily the feed-roller $g$ is mounted upon a sleeve $g'$, that is put on the shaft end $b^2$ and there secured by a nut $g^2$. In a similar manner the top feed-roller $g$ (likewise of india-rubber) is mounted upon a sleeve $g'$, that is put on a short shaft J and secured by a nut $g^2$. The shaft J is journaled in a sleeve or bearing forming part of an arm $h^3$, that is made in one piece with the rod $h$. The sleeve $g'$ is hollowed out and made to rest and revolve upon the sleeve attached to the arm $h^3$. To avoid the shaft J being jammed, the sleeve $g'$ is prevented from shifting on the shaft J by a pin, as shown, or otherwise, while it is secured by the nut $g^2$. Since the shaft $f$ is journaled in rigid bearings, it is necessary to provide a yielding connection between the shaft $f$ and the shaft J, so as to allow of the latter, with the top feed-roller, being lowered and raised according to the varying diameter of the sugar rod $z$. For this reason I employ an intermediate shaft $i$, having at both ends cylindrical recesses, and I provide the two shafts $f$ and J with ball-like ends $i^2$ and $i'$, respectively, for fitting into the said recesses of the intermediate shaft $i$, in which they are allowed to slide when the shaft J is being raised or lowered. To transmit the revolving motion from the shaft $f$ to the shaft J, their ends $i^2$ and $i'$ are provided with pins, as shown, and the two ends of the shaft $i$ are each provided with two slots for receiving the said pins. Thus two yielding universal joints are formed between the three shafts $f$, $i$, and J.

The rod $h\ h'$ is arranged to slide in a box or sleeve $k$, while it is prevented from turning by an arm $t$, parallel to it and sliding in a suitable hole or guideway provided in the frame A of the machine. The rod $h$ is pressed downward by a coiled spring $h^2$, introduced in the box or sleeve $k$ and acting at the bottom end upon a shoulder of the rod $h$, while at the top end it bears against the cap or cover $k'$. The rod $h\ h'$ is limited in its stroke by any suitable means—for example, by the ring $h^5$, fixed to the top end of the thinner part $h'$.
To regulate the pressure of the two feed-rollers $g\ g$, the box or sleeve $k$ is provided with a thread on the outside engaging the female thread of the frame A, so that it may be screwed up or down. The cap or cover $k'$ is therefore adjustable longitudinally of the sleeve $k$ and may be secured against movement after adjustment by a screw $k^2$ engaging both the cap $k'$ and the sleeve $k$. (See Fig. 1.) The cap obviously forms a means for adjusting the tension of the spring $h^2$.

The rotating cutters $m$ $m$, the action of which upon the sugar rod $z$ may be seen in Fig. 4, are driven from the crank C by means of the spur-wheels $a$ and $b^3$, the shaft $c$, the bevel-wheels $c'$ and $d'$, the spur-wheels $d^2$ and $e^2$, and the vertical shafts $d$ and $e$.

The machine is shown as having a support B for the channel $r$, in which the sugar rod $z$ may be guided; but this arrangement is immaterial.

The pieces cut off the sugar rod $z$ are thrown by the cutters $m$ $m$ on the chute $o$ and are thereby conducted to some suitable place. To separate them from the stumps or ends of the rod $z$, I employ a special chute $u$, attached to the frame A and below the feed-rollers $g$ $g$. When the end of the sugar rod $z$ is no longer held by the two feed-rollers, it will fall down upon the chute $u$ and slide off.

It will of course be understood that the chute $u$, as shown in Fig. 2, has its upper or receiving end in a vertical plane passing between the feed-rollers and the cutters, while the chute $o$ has its upper or receiving end arranged beyond the cutters—that is, in the rear thereof.

I have shown the special construction of the two feed-rollers whereby they may be replaced by other ones easily; but this construction may be altered according to circumstances. The shafts J and $f$ are shown as having ball-like ends with pins and the intermediate shaft $i$ as having recesses at the ends; but instead of this the shafts J and $f$ may have recesses with slots and the shaft $i$ may have ball-like ends with pins.

Having fully described this my invention, I declare that what I claim, and desire to secure by Letters Patent, is—

In a machine for automatically chopping or cutting rods of candied sugar and the like into desired lengths, the combination with the cutting mechanism and a driving-shaft $f$, journaled in rigid bearings, of a top-feed-roller shaft J, an intermediate shaft $i$, having universal joints for engaging said two shafts J and $f$, a spring-pressed rod $h$ arranged to slide vertically and having an arm $h^3$ with sleeve, in which said top-feed-roller shaft is journaled, an arm $t$ running parallel to and attached to said rod $h$ and arranged to slide vertically in a guide for preventing said rod $h$ from turning, and an externally-threaded guiding-box $k$ for said rod $h$ and the spring acting thereon, said guiding-box being arranged for screwing up or down in the machine-frame to regulate the pressure between the top and bottom feed-rollers, substantially as set forth.

In witness whereof I have hereunto signed my name, this 22d day of June, 1898, in the presence of two subscribing witnesses.

GUSTAV STOFF.

Witnesses:
C. H. DAY,
HENRY HASPER.